Aug. 28, 1934.   D. M. SIMMONS   1,971,626
CABLE INSTALLATION
Filed Oct. 16, 1928
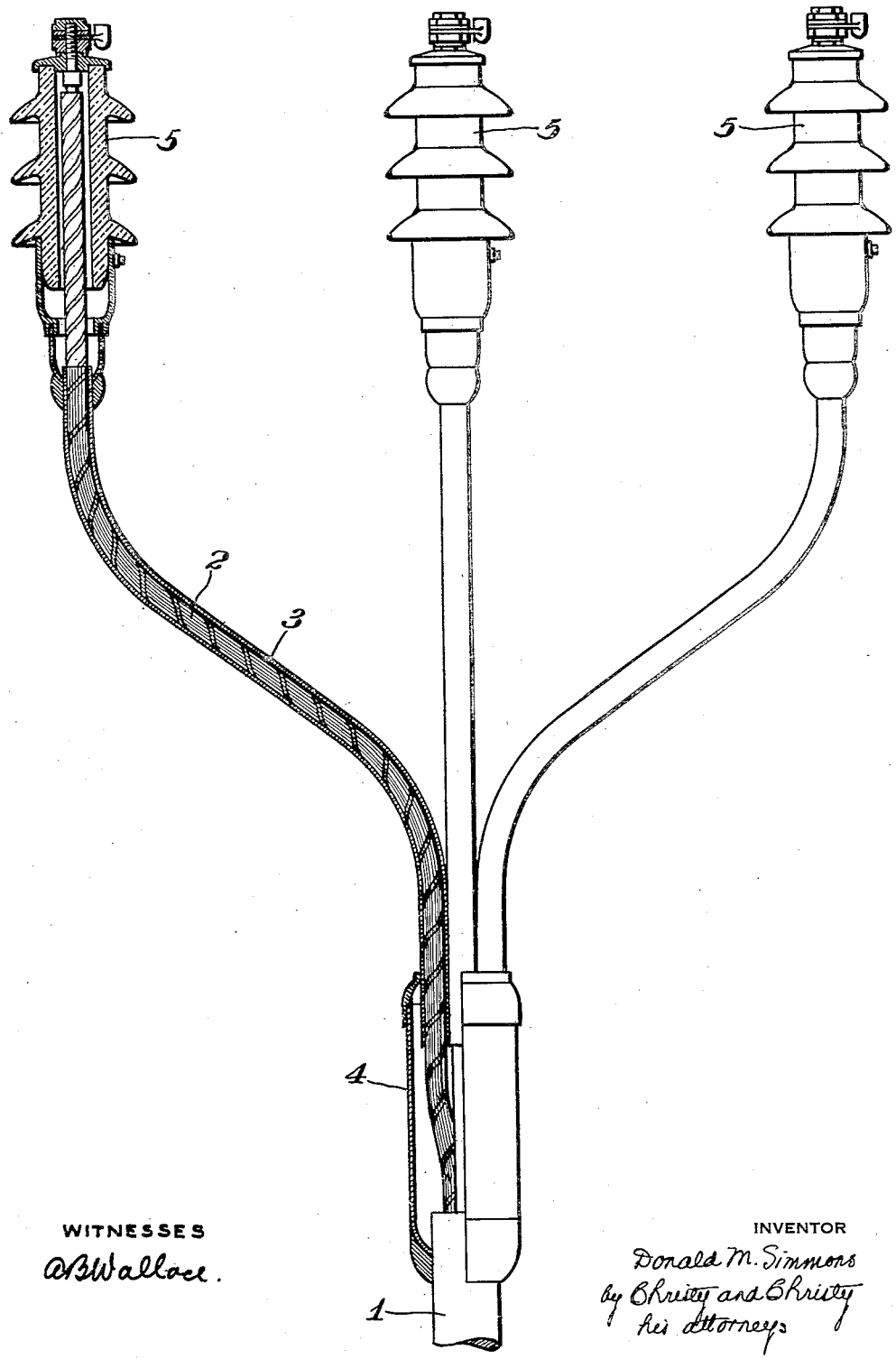
WITNESSES
OBWallace.
INVENTOR
Donald M. Simmons
by Christy and Christy
his attorneys Patented Aug. 28, 1934

1,971,626

UNITED STATES PATENT OFFICE 1,971,626

CABLE INSTALLATION

Donald M. Simmons, Osborne, Pa., assignor to General Cable Corporation, New York, N. Y., a corporation of New Jersey Application October 16, 1928, Serial No. 312,836

8 Claims. (Cl. 247—6)

My invention relates to the art of installing multi-conductor cables, and consists both in a method of effecting installation, and in the structure which in pursuance of the method is produced. The objects are economy and adaptability in installation and efficiency in service.

The accompanying drawing shows partly in elevation and partly in axial section a portion of a multi-conductor cable installation, and illustrates how my invention may be practiced. The invention here is shown as it is employed in making a terminal installation. In the sequel I shall indicate that the invention is applicable elsewhere in the line of a cable installation, as well.

The procedure which hitherto has been the usual one in making a terminal installation for a multi-conductor cable has been to build a joint structure in which each conductor of the multi-conductor cable is connected to the conductor of one of a corresponding plurality of lengths of single-conductor cable; and then to equip each of these single-conductor cables, in which collectively the multi-conductor cable has been merged, with its own pot-head. The reason for doing this is that for very high voltages a multi-conductor terminal would have to be very large, very heavy, and very expensive, whereas the pot-heads of the three single-conductor cables, being relatively small and light, may be spaced and arranged as desired. For instance, they may readily be located at convenient points, adjacent the ends of the overhead wires with which connections are to be made, perhaps on a pole or perhaps in a station.

In some cases it is no serious matter, so to build a terminal. If, for instance, the last manhole in an underground installation happens to be conveniently near the place where the terminal is to be situated, the joint may be built within the manhole and the single-conductor cables may extend thence to the pole or other place to which the overhead wires are brought. Ordinarily, however, the joint between the multi-conductor cable and the plurality of lengths of single-conductor cable is made at the foot of the pole; and the location of the special joint at that place ordinarily makes necessary another joint within the extent of the multi-conductor cable. And if a particular installation happens to include no more than a short length of multi-conductor cable, the expense and the danger of a special joint of the character indicated are relatively serious.

The invention lies in an expedient which avoids the necessity of such a special joint, or indeed any joint, as that term ordinarily is understood. The multi-conductor cable 1 is continued to and beyond the point where in ordinary practice the usual joint with the plurality of lengths of single-conductor cable would be built. At that point the cable sheath is marked, and then from the end of the length of cable to the marked point the sheath is stripped away. The individually insulated conductors 2 of the multi-conductor cable are then fanned out, and over each a length 3 of pipe is slipped. Each of the three insulated cable conductors when thus encased in pipe becomes in effect a single-conductor cable, in the ordinary meaning of that term. A branch joint 4 then is formed between the end of the sheath of the multi-conductor cable 1 and the pipes 3 which encase the conductors severally. A joint structure of such nature is known to the art.

The severally encased conductors are then dealt with as single-conductor cables, and as shown in the drawing, each, for example, may be equipped with a terminal structure 5, and so prepared for connection with an overhead wire. If, as is preferable, the pipes applied to the fanned-out conductors be flexible, as they will be if made of lead, there is the further advantage that the conductors when enveloped within them may be individually trained to position for connection with other conductors.

The pipes 3 encasing the conductors 2 should, of course, be filled with cable compound, oil, or other suitable insulation of proper fluidity. If oil-filled terminals are to be employed, the spaces within the pipes will ordinarily be filled with the same insulating oil.

If the cable be of the now prevalent construction for high-voltage work, with a thin integument of metal immediately overlying the insulation which surrounds each conductor individually, there would be no disadvantage, so far as concerns stress, in having considerable space between the body of the insulated conductor and the wall of the encasing pipe 3, for the integument of metal limits the stress which arises when the conductor is carrying its load. In the drawing the portion of the structure shown in section includes an insulated cable conductor which is conventionally indicated to be provided with such a thin metal integument. The metal integument extends as far as the encasing pipe extends, but no farther. Within the terminal casing the end of the insulated conductor extends, bare of this integument. The conductors of such a cable as is here indicated are, ordinarily, of sector-shape in cross-section. No effort is made in the drawing to indicate such refinement of shape, but without particular illustration, it will be understood that the looseness of fit here alluded to will suffice. The sector-shaped conductor may be encased in a pipe of circular cross-section.

If the cable conductors be sector-shaped, but not wrapped individually in metal integuments, it ordinarily will be desirable to build out the conductor with added bodies of insulation to fit snugly within round pipes. The insulation added in such case may be secured by taping, or a stocking of insulation or some tubular fabric may be slipped to place on the conductor, and tubular fabric so slipped on may be found a time-saving expedient, and an adequate one, since the only purpose in such building on of insulation is to avoid large spaces whose filling of oil would in service be subjected to electrical stress.

Among the problems which confront the workmen in making installation of multi-conductor high-voltage cables, is the frequent one consequent upon insufficiency of space within which to build a joint. This difficulty is the more pronounced if the joint is to be a machine-made one. In such a situation, my invention again becomes serviceable. The cable sheath is stripped away; the individually insulated conductors are fanned out; pipes are slipped over each insulated conductor, and these pipes are mechanically united to the cut-away end of the cable sheath. Then each pipe-encased conductor is treated as a length of single-conductor cable, and each is connected by a properly built joint to the corresponding conductor of an adjacent cable length whose proximate end has similarly been prepared. It is a much simpler matter to build a single-conductor cable joint than a multi-conductor cable joint, and thus the problem which, as has been said, confronts the workman is solved.

I claim as my invention:

1. The method herein described of preparing a sheathed multi-conductor cable for electric union which consists in removing from one end of the cable a portion of the cable sheath, spreading the unsheathed conductor ends, applying to the conductor ends severally lengths of flexible impervious pipe, and integrating the applied lengths of pipe with the remaining portion of the original cable sheath.

2. A multi-conductor cable prepared at its end for electrical union, such cable including a flexible sheath prolonged at one end in a plurality of flexible branches, and a plurality of individually insulated conductors extending in unbroken continuity through sheath and branches, the arrangement being such that the conductors within the branches may be individually trained to position for connection with other conductors.

3. A sheathed, multi-conductor cable whose individually insulated conductors extend in unbroken continuity beyond the end of the cable sheath, a plurality of pipes within which the individually insulated conductors extending beyond the cable sheath are severally enclosed, a branch joint structure united to the cable sheath and to the said pipes severally, and a plurality of closures through which the cable conductors are electrically accessible secured on the outer ends of said pipes permitting connection of the cable conductors with other conductors.

4. The method of terminating multiple-conductor shielded cable with a plurality of single-conductor pot-heads which comprises removing from one end of the cable a portion of the cable sheath, spreading the unsheathed but individually insulated and shielded conductor ends, applying to each insulated and shielded conductor end a loosely fitting length of pipe, integrating the adjacent ends of the applied lengths of pipe with the end of the cable sheath, individually training the several pipes and enclosed conductors to optimum positions for connection with other conductors, and applying to the end of each of the pipe-enclosed conductors a single-conductor pot-head.

5. The method of terminating multiple-conductor cable with a plurality of single-conductor pot-heads which comprises removing the cable sheath from one end of the cable, spreading the unsheathed individually insulated conductor ends, individually sheathing the conductor ends with lengths of flexible pipe, integrating the individual sheaths with the cable sheath, training the individually sheathed conductor ends severally to optimum positions for connection with other conductors, and applying a pot-head to each individually sheathed conductor end.

6. A flexible terminal assembly for multiple-conductor shielded-type cable comprising, in combination, a spreader head connected fluid-tight to the cable sheath, a plurality of flexible branch pipes larger than the individually insulated and shielded conductors of the cable connected fluid-tight to the spreader head and individually trained to optimum positions for connection with other conductors, the individually insulated and shielded conductors of the cable extending unbroken from the cable sheath through the spreader head and loosely through the branch pipes, and a single-conductor pot-head terminating each of said branch pipes.

7. A terminal for flexible sheathed, multiple-conductor cable comprising, in combination, a spreader head united with the end of the cable sheath, a plurality of flexible branch sheaths connected at their ends to the spreader head, the individually insulated conductors of the cable extending unbroken from the cable sheath through the spreader head and branch sheaths, and a plurality of closures through which the cable conductors are electrically accessible secured on the ends of the branch sheaths permitting connection of the cable conductors with other conductors.

8. The method of terminating multi-conductor cable with a plurality of single-conductor pot-heads, which comprises removing from one end of the cable a portion of the cable sheath, spreading the unsheathed but individually insulated conductor ends, applying to each insulated conductor end a loosely fitting length of pipe, integrating the adjacent ends of the applied lengths of pipe with the end of the cable sheath, and applying to the outer end of each of the pipes a closure through which the enclosed conductor is electrically accessible for connection with another conductor.

DONALD M. SIMMONS.